(12) United States Patent
Liu

(10) Patent No.: US 6,997,158 B1
(45) Date of Patent: Feb. 14, 2006

(54) DIESEL COMBUSTION CHAMBER

(75) Inventor: Zhengbai Liu, Naperville, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 33 days.

(21) Appl. No.: 10/960,662

(22) Filed: Oct. 7, 2004

(51) Int. Cl.
    *F02F 3/26* (2006.01)
(52) U.S. Cl. ..................... 123/279; 123/307
(58) Field of Classification Search .......... 123/269, 123/279, 285, 307, 193.6, 281, 282
    See application file for complete search history.

(56) References Cited

U.S. PATENT DOCUMENTS

| | | | |
|---|---|---|---|
| 2,742,883 A * | 4/1956 | Smith ................... 123/41.38 |
| 4,164,913 A | 8/1979 | Komiyama et al. |
| 4,366,891 A | 1/1983 | Maruyama |
| 4,535,683 A | 8/1985 | Dworak et al. |
| 4,721,080 A | 1/1988 | Moriyasu et al. |
| 4,883,032 A | 11/1989 | Hunter et al. |
| 5,029,563 A | 7/1991 | Hu |
| 5,099,809 A * | 3/1992 | Kawatani et al. ........ 123/276 |
| 5,285,755 A | 2/1994 | Regueiro |
| 5,413,074 A * | 5/1995 | Horiuchi ................ 123/197.2 |
| 5,560,334 A | 10/1996 | Daxer et al. |
| 5,653,204 A | 8/1997 | Shaffer |
| 5,809,962 A | 9/1998 | Abbott et al. |
| 5,868,112 A | 2/1999 | Mahakul et al. |
| 5,954,038 A | 9/1999 | Warwick et al. |
| 5,979,298 A * | 11/1999 | Whitacre ................ 92/211 |
| 6,026,777 A * | 2/2000 | Kemnitz et al. .......... 123/193.6 |
| 6,095,306 A | 8/2000 | Hu et al. |
| 6,112,715 A | 9/2000 | Nigro et al. |
| 6,513,476 B1 | 2/2003 | Liu et al. |
| 6,513,477 B1 * | 2/2003 | Gaiser et al. ............ 123/193.6 |
| 6,536,404 B1 | 3/2003 | Liu et al. |
| 6,539,910 B1 * | 4/2003 | Gaiser et al. ............ 123/193.6 |
| 6,601,561 B1 | 8/2003 | Liu et al. |
| 6,637,402 B1 | 10/2003 | Liu |
| 6,701,875 B1 * | 3/2004 | Weng et al. ............ 123/41.35 |
| 6,705,273 B1 | 3/2004 | Liu et al. |
| 6,732,702 B1 | 5/2004 | Liu et al. |
| 6,825,450 B1 * | 11/2004 | Ribeiro et al. ............ 219/635 |
| 6,892,689 B1 * | 5/2005 | Bischofberger et al. . 123/193.6 |
| 2004/0112323 A1 | 6/2004 | Liu |
| 2004/0129242 A1 * | 7/2004 | Mahakul et al. .......... 123/193.6 |
| 2004/0177828 A1 | 9/2004 | Liu |

FOREIGN PATENT DOCUMENTS

DE 4033822 * 6/1991
JP 2001-221050 * 8/2001

* cited by examiner

*Primary Examiner*—Hai Huynh
(74) *Attorney, Agent, or Firm*—Dennis Kelly Sullivan; Susan L. Lukasik; Jeffrey P. Calfa

(57) ABSTRACT

A combustion chamber assembly for use in a diesel engine includes a combustion chamber being defined intersecting a crown of a piston, the combustion chamber being defined by a first curved surface having a reentrancy formed proximate a first curved surface first end and having a post formed proximate a first curved surface second end, a corner being formed at a juncture of the first curved surface second end and the post, adjacent surfaces being direct smooth junctures. A piston and a method of forming a combustion chamber are further included.

43 Claims, 5 Drawing Sheets

DIESEL COMBUSTION CHAMBER

TECHNICAL FIELD

The present invention relates to a piston designed for use in a compression ignition (diesel) internal combustion engine. More particularly, the present invention relates to a combustion chamber defined in part in a piston and intersecting the crown of the piston.

BACKGROUND OF THE INVENTION

Many attempts have been made to produce an ideal flow pattern for the charge of air and fuel within the combustion chamber of a diesel internal combustion engine. Considerations that must be taken into effect include, but are not limited to, providing for adequate power generation, minimizing the $NO_x$ entrained in the engine exhaust, and minimizing the amount of soot particulate also entrained in the engine exhaust. These last two considerations should be accomplished without hurting the fuel economy of the engine and without adversely affecting the power output of the engine.

It is known that changes in any one of a variety of engine design/operating variables, such as engine compression ratio, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the NOx emissions from the engine. Ever increasing regulatory demands mandate reduced levels of NOx. Typically, a combustion chamber design that is effective at reducing NOx levels has been found to increase the levels of soot and vice-versa. Additionally, doing either of the aforementioned typically reduces engine torque and power outputs.

There are numerous examples of combustion chambers formed in the crown of a piston. Notwithstanding all these prior art designs, there remains a need for reduction both in NOx and entrained soot while at the same time maintaining or enhancing engine torque and power outputs without adversely affecting the fuel economy of the engine.

SUMMARY OF THE INVENTION

The piston of the present invention substantially meets the aforementioned needs of the industry. The combustion chamber of the present invention defined intersecting the crown of the piston has been shown by substantiated simulation to greatly increase turbulence kinetic energy to the chamber and thereby to both reduce soot entrainment and NOx emissions as compared to a known combustion chamber. The piston has been shown to function effectively with cylinder heads having two or more valves. A further advantage of the piston of the present invention is that by being symmetrical with respect to a piston central axis, the combustion chamber is relatively more easily formed in the crown of the piston than known asymmetrical combustion chambers. The piston and combustion chamber of the present invention are preferably used in heavy-duty and medium-duty diesel engines.

The present invention is a combustion chamber assembly for use in a piston of a diesel engine and includes a combustion chamber being defined intersecting a crown of the piston, the combustion chamber being defined by a first curved surface having a reentrancy formed proximate a first curved surface first end and having a post formed proximate a first curved surface second end, a corner being formed at a juncture of the first curved surface second end and the post, adjacent surfaces having direct smooth junctures. The present invention is further a piston including the above combustion chamber assembly and a method of forming a combustion chamber.

DETAILED DESCRIPTION OF THE DRAWINGS

Figure 1:
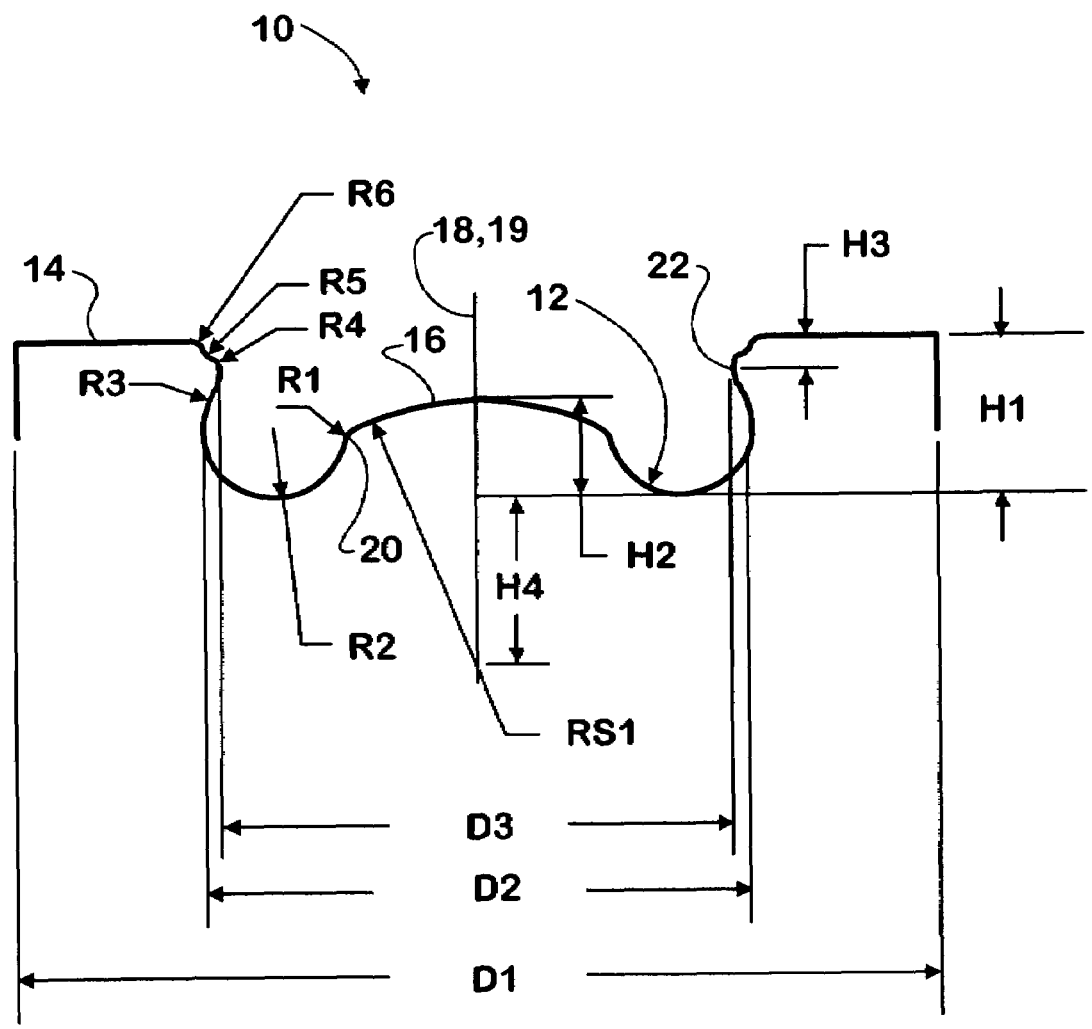
FIG. 1 is a sectional view of the piston and combustion chamber of the present invention.

The piston of the present invention is shown generally at 10 in FIG. 1. Generally, the piston 10 has a centrally located symmetrical upward-opening chamber bowl assembly for forming a combustion chamber 12 in cooperation with cylinder structure within a cylinder of a diesel engine. The combustion chamber 12 is defined intersecting the crown 14 of the piston 10. The engine has a fuel injector (not shown) disposed generally above the piston 10 for forming a downward directed injected fuel plume relative to the combustion chamber 12. The piston 10 may be utilized with two-valve or multiple-valve heads. The piston 10 is effective for reducing diesel engine pollutant emissions, such as NOx and soot, as depicted in the graphic representations of FIGS. 2–9. The piston 10 is preferably applicable to heavy-duty and medium duty diesel engines.

A combustion chamber located in a piston of diesel engines generally is comprised of a bottom portion and a side portion. There is a combustion chamber post 16 at the center of the bottom portion. The post 16 is an upwardly tending, centrally disposed round symmetrical structure. A convex spherical surface RS1 with a radius of RS1 forms the top surface of the combustion chamber post 16. The post 16 is smoothly coupled to an annular surface R2. The concave annular surface R2 with the radius of R2 provides (1) the outside of the combustion chamber bowl 12 bottom portion; (2) the lower part of the combustion chamber bowl 12 side portion; (3) the minor part of the combustion chamber bowl reentrancy at a bowl lip 22 (discussed in detail below); and (4) the side of the combustion chamber post 16. A reentrancy is ring-shaped structure that projects radially into the volume of the combustion chamber 12 and has a lesser diameter than adjacent surfaces. A small annular surface R1 with a radius of R1 smoothly connects the convex spherical surface RS1 with the concave annular surface R2 and forms the corner 20 of the post 16. The corner 20 defined by the radius R1 advantageously generates significant turbulence in the combustion chamber 12. The corner 20 is formed at the joining of the convex surface RS1 and the concave surface R2, the radius R1 forming the juncture and being coupled at a first end to surface RS1 and at a second end to surface R2.

Five annular surfaces sequentially form the combustion chamber bowl reentrancy (lip 22), of which three are concave annular surfaces and two are convex annular surfaces. A convex annular surface R4 with a radius of R4 forms the central part of the combustion chamber reentrancy at lip 22. A concave annular surface R3 with a radius of R3 forms the lower part of the combustion chamber reentrancy, and smoothly connects the convex annular surface R4 with the concave annular surface R2. A small end portion of the concave annular surface R2 helps form the minor lower part of the combustion chamber bowl reentrancy at lip 22. A concave annular surface R5 with a radius of R5 forms the upper part of this combustion chamber reentrancy. A small convex annular surface R6 with a radius of R6 helps form the minor upper part of the combustion chamber bowl reentrancy, and functions mainly as the smooth transition between the combustion chamber bowl reentrancy at lip 22 and the piston top surface (crown 14). All of the above curved surfaces are connected smoothly.

It can be seen from FIG. 1 that the spherical surface RS1 with the radius of RS1 is located on the centerline 18 of the combustion chamber 12. Definitionally in FIG. 1, D1 is the piston diameter, D2 is the maximum bowl diameter, D3 is the bowl lip diameter, H1 is the bowl depth, H2 is the height of bowl post 16, and H3 is the distance between the bowl reentrancy center (lip 22) and the piston top surface (crown 14).

The fuel spray (not shown) is preferably downward directed toward the bowl reentrancy center to get better breakups and distribute the fuel reasonably below and above the bowl reentrancy (lip 22).

The origin of spherical surface RS1 is located on the central axis 18 of the combustion chamber bowl 12. The distance H4 between the origin of spherical surfaces RS1 and the point of intersection of the combustion chamber axis with the bottom plane of the combustion chamber should be equal to or greater than zero and should be less than 0.25 D1, and is preferably 0.185 D1.

The following relationships of parameters controls the combustion chamber 12 geometry, and the combustion performance and emissions in diesel engines, which are listed below:

1. The ratio of D1/D1 should be greater than 0.45 and should be less than 0.85, and is preferably 0.587.
2. The ratio of D3/D2 should be greater than 0.45 and should be less than 0.995, and is preferably 0.94.
3. The ratio of RS1/D2 should be greater than 0.15 and should be less than 0.65, and is preferably 0.497.
4. The ratio of H1/D2 should be greater than 0.15 and should be less than 0.55, and is preferably 0.292.
5. The ratio of H2/D2 should be greater than 0.05 and should be less than 0.35, and is preferably 0.181.
6. The ratio of H3/D2 should be greater than 0.05 and should be less than 0.25, and is preferably 0.056.
7. The ratio of R2/D2 should be greater than 0.05 and should be less than 0.35, and is preferably 0.129.
8. The ratio of R3/D2 should be greater than 0.15 and should be less than 0.45, and is preferably 0.292.
9. The ratio of R4/D2 should be greater than 0.015 and should be less than 0.15, and is preferably 0.028.
10. The ratio of R5/D2 should be greater than 0.05 and should be less than 0.25, and is preferably 0.073.

It should be noted that the radius RS1 is significantly greater than the radius R2 (see nos. 3 and 7 above for the difference in the ratios as compared to D2). This contributes to forming the corner 20 at the juncture of RS1 and R2, formed smoothly by R1. As noted above, the corner 20 contributes to the desired increased gas turbulence in the combustion chamber 12.

Figure 2:
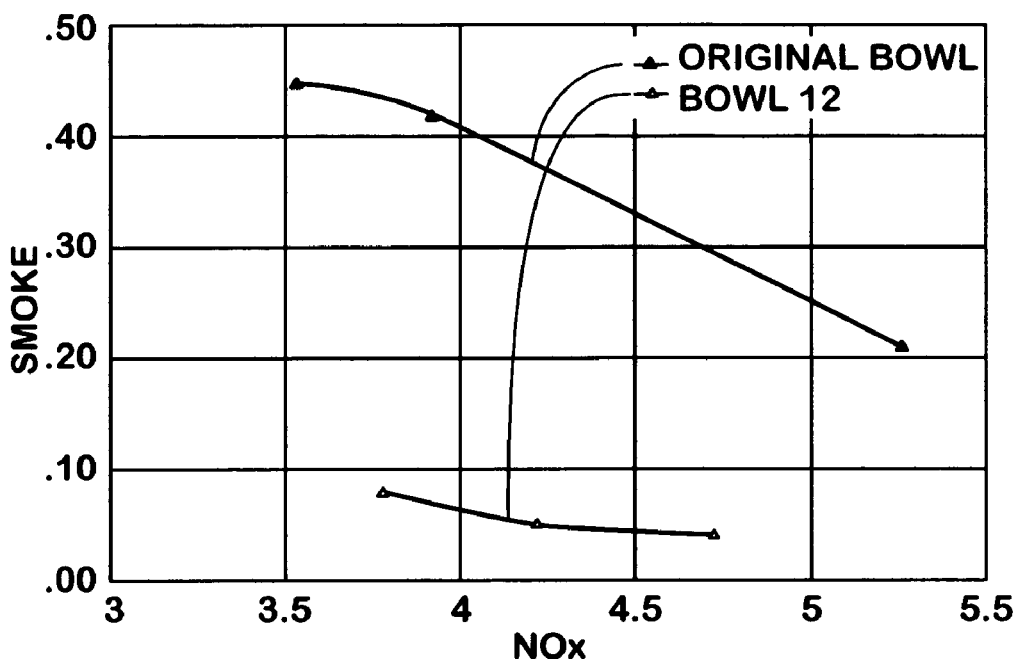
FIG. 2 is a graphic representation of a prior art original combustion chamber bowl of NOx and smoke at low speed and high load and an experimental result of the same parameters generated by an engine with pistons and combustion chambers of the present invention.
Figure 3:
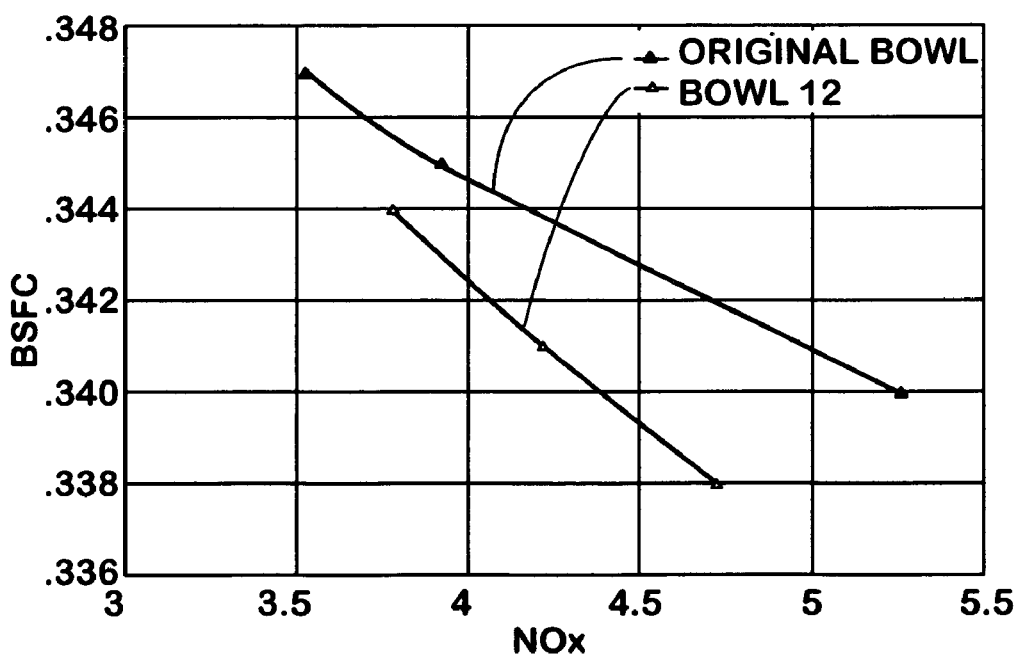
FIG. 3 is a graphic representation of a prior art original combustion chamber bowl of NOx and brake specific fuel consumption (BSFC) at low speed and high load and an experimental result of the same parameters generated by an engine with pistons and combustion chambers of the present invention.
Figure 4:
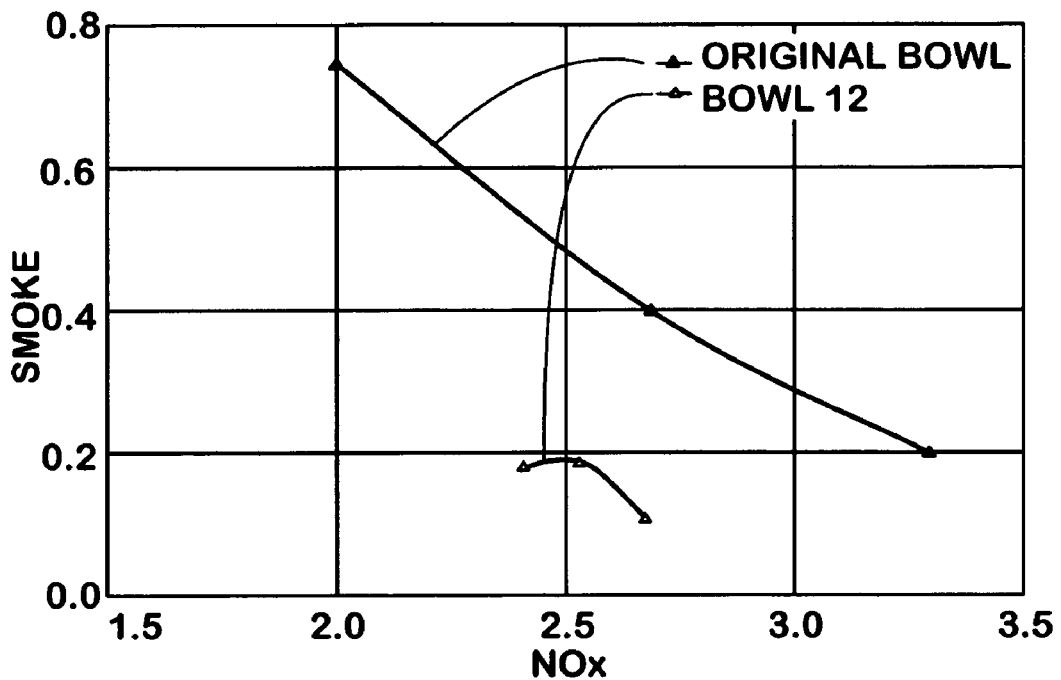
FIG. 4 is a graphic representation of a prior art original combustion chamber bowl of NOx and smoke at low speed and low load and an experimental result of the same parameters generated by an engine with pistons and combustion chambers of the present invention.
Figure 5:
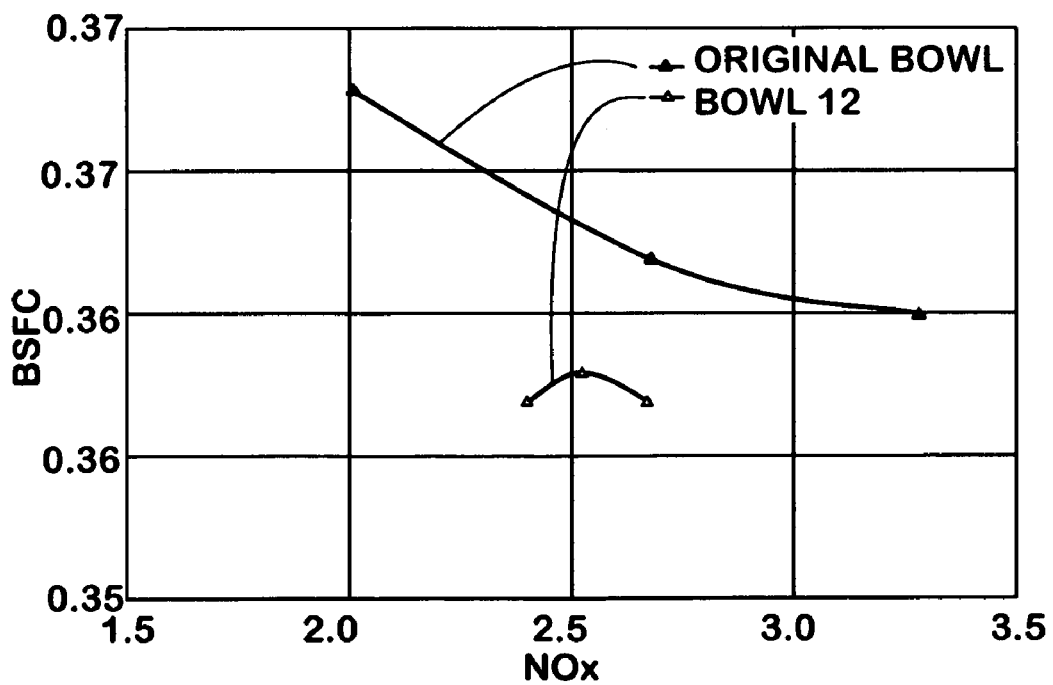
FIG. 5 is a graphic representation of a prior art original combustion chamber bowl of NOx and brake specific fuel consumption (BSFC) at low speed and low load and an experimental result of the same parameters generated by an engine with pistons and combustion chambers of the present invention.
Figure 6:
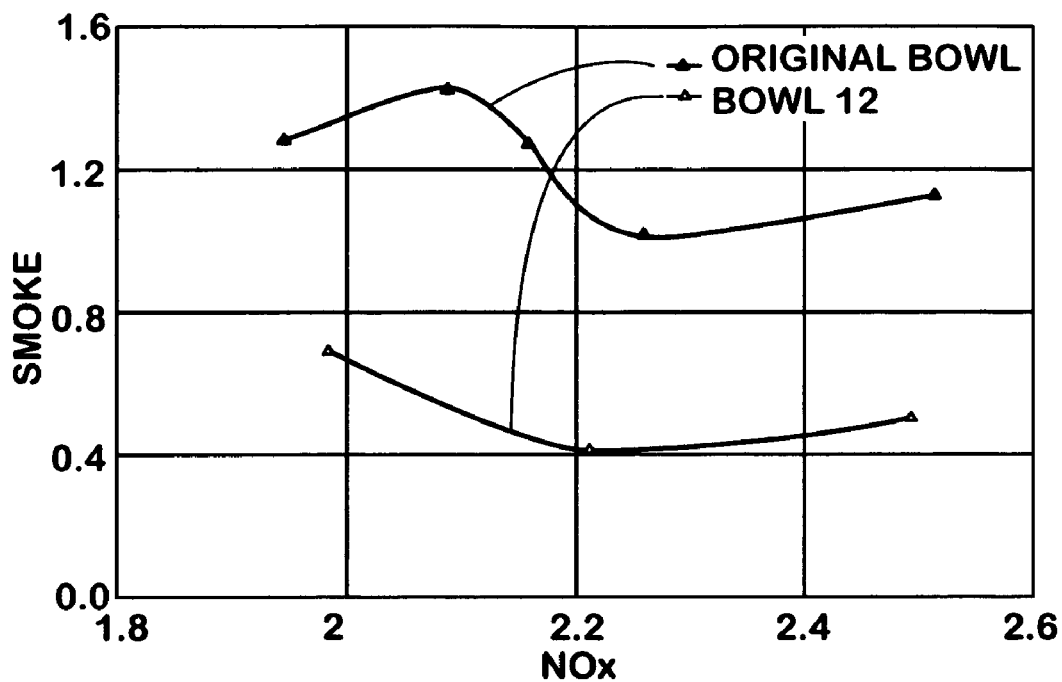
FIG. 6 is a graphic representation of a prior art original combustion chamber bowl of NOx and smoke at high speed and high load and an experimental result of the same parameters generated by an engine with pistons and combustion chambers of the present invention.
Figure 7:
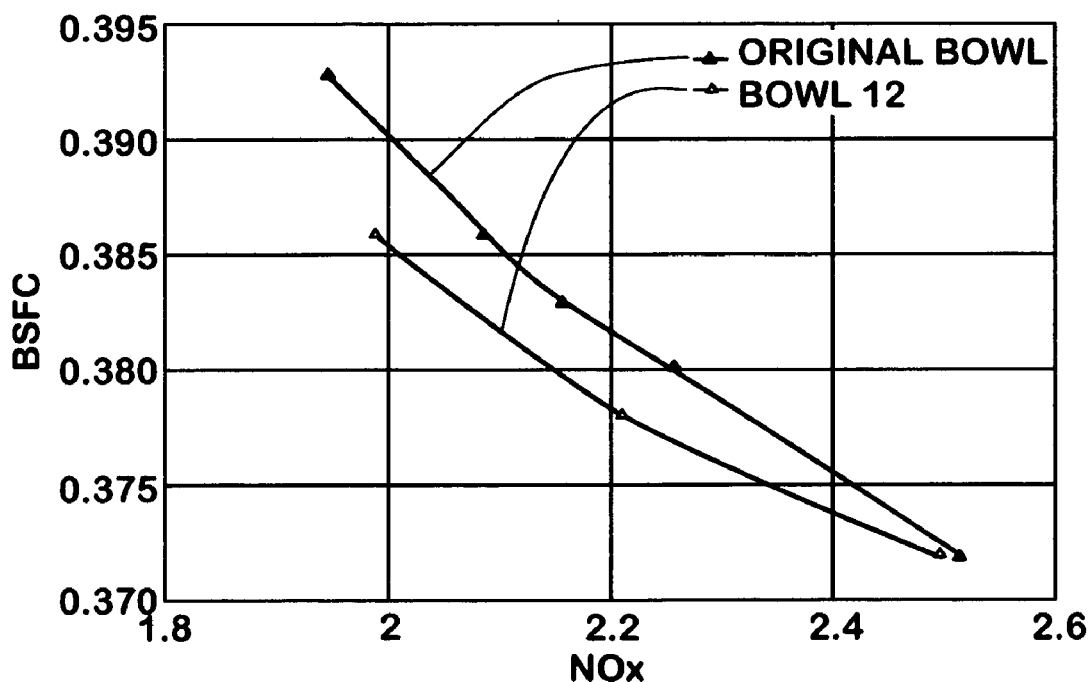
FIG. 7 is a graphic representation of a prior art original combustion chamber bowl of NOx and brake specific fuel consumption (BSFC) at high speed and high load and an experimental result of the same parameters generated by an engine with pistons and combustion chambers of the present invention.
Figure 8:
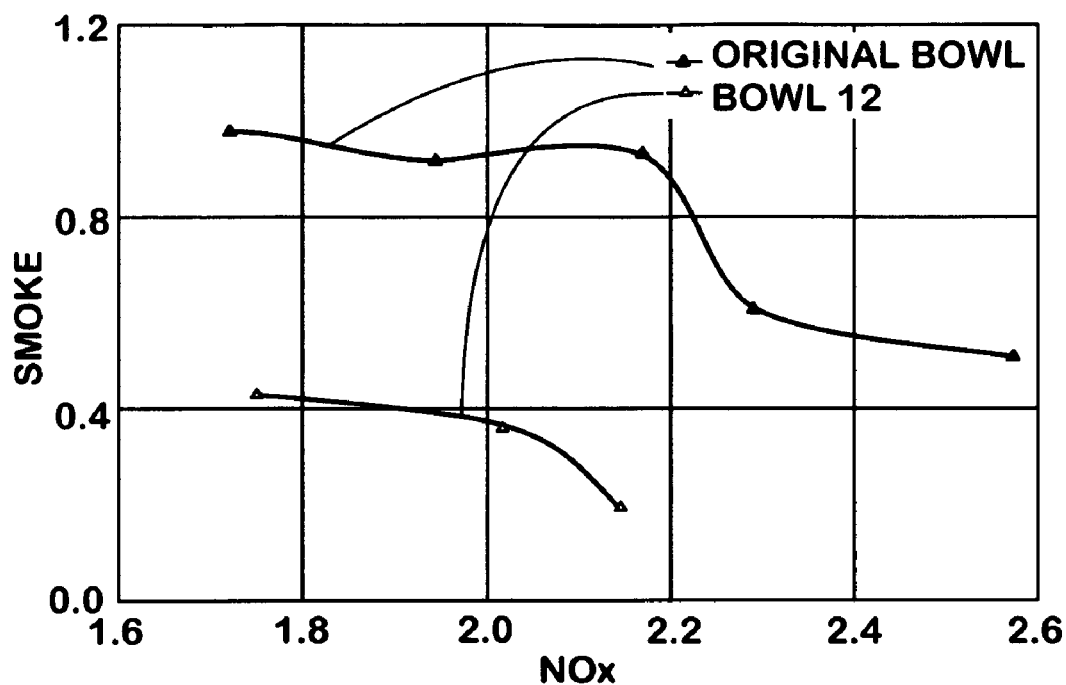
FIG. 8 is a graphic representation of a prior art original combustion chamber bowl of NOx and smoke at high speed and low load and an experimental result of the same parameters generated by an engine with pistons and combustion chambers of the present invention.
Figure 9:
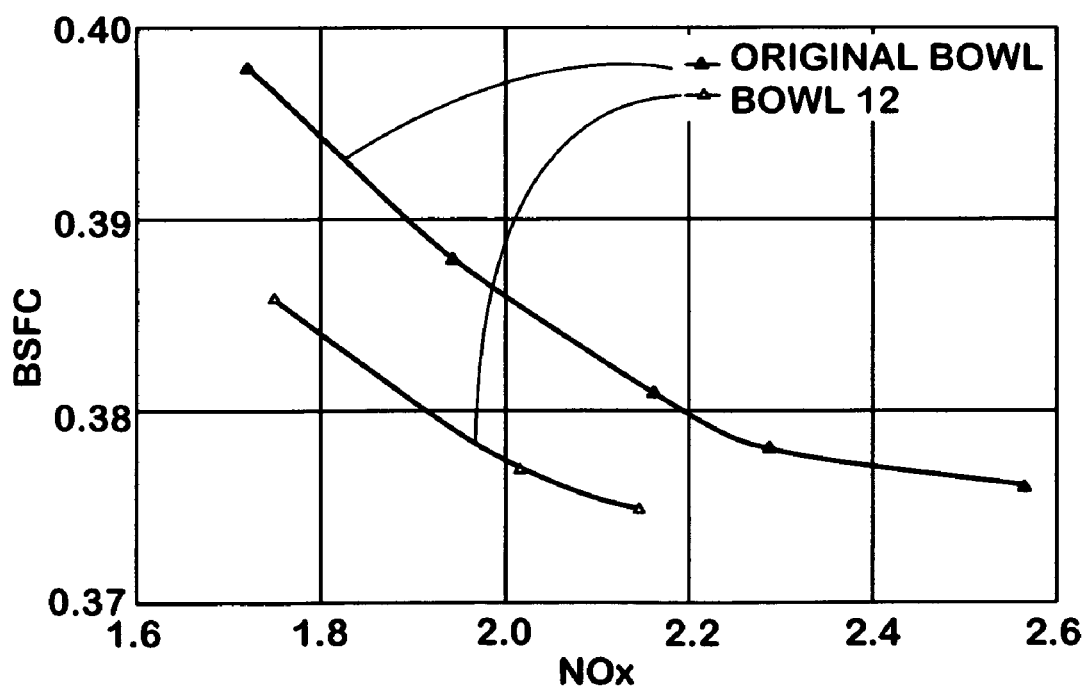
FIG. 9 is a graphic representation of a prior art original combustion chamber bowl of NOx and brake specific fuel consumption (BSFC) at high speed and low load and an experimental result of the same parameters generated by an engine with pistons and combustion chambers of the present invention.

FIGS. 2 through 9 show the improved effects of the present combustion chamber on NOx and smoke emissions and BSFC at different engine speeds and loads as compared to a prior art original bowl (combustion chamber). The original bowl has straight lines at the bottom and side wall. A center post in the original bowl has a straight line at its top disposed at an angle, thereby giving the original bowl three straight lines. FIG. 2 shows the improved effects of bowl on NOx emissions and smoke at low speed and high load. FIG. 3 shows the improved effects of bowl on NOx emissions and BSFC at low speed and high load. FIG. 4 shows the improved effects of bowl on NOx emissions and smoke at low speed and low load. FIG. 5 shows the improved effects of bowl on NOx emissions and BSFC at low speed and low load. FIG. 6 shows the improved effects of bowl on NOx emissions and smoke at high speed and high load. FIG. 7 shows the improved effects of bowl on NOx emissions and BSFC at high speed and high load. FIG. 8 shows the improved effects of bowl on NOx emissions and smoke at high speed and low load. FIG. 9 shows the improved effects of bowl on NOx emissions and BSFC at high speed and low load. From inspection of FIGS. 2 through 9 at is demonstrated that the emissions of NOx and smoke, and BSFC in the new combustion chamber are reduced dramatically, compared with the original combustion chamber described above.

The curved surfaces and smooth transitions (junctures between adjacent curved surfaces) of the combustion chamber 12 as previously described promote smooth flow in the combustion chamber 12 and act to reduce the thermal loading in the combustion chamber 12. Further, the combustion chamber 12 is symmetrical about the chamber axis 18 and preferably also about the piston axis 19 (depicted as being coincident in FIG. 1). Accordingly, it is much easier to turn (form) the combustion chamber 12 in the crown 14 of the piston 10 as compared to an asymmetrical combustion chamber defined in a piston.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A combustion chamber assembly for use in a diesel engine, comprising:
a combustion chamber being formed free of flat surfaces and being defined intersecting a crown of a piston, the combustion chamber being defined by a first curved surface having a reentrancy formed proximate a first curved surface first end and having a post formed proximate a first curved surface second end, a corner being formed at a juncture of the first curved surface second end and the post, adjacent surfaces having smooth junctures therebetween.

2. The combustion chamber assembly of claim 1, a combustion chamber center portion being defined at least in part by the post, a post surface being a convex spherical surface, the spherical surface having a radius and an origin, the spherical surface radius being substantially greater than a radius of the first curved surface; and
the combustion chamber first curved surface being a concave annular surface and having an origin of the radius, the first curved surface providing a minor part of the combustion chamber reentrancy.

3. The combustion chamber assembly of claim 2, wherein the reentrancy is formed by four sequentially joined annular surfaces in cooperation with the first curved surface.

4. The combustion chamber assembly of claim 3, the four sequentially joined annular surfaces and the first curved surface comprising three concave annular surfaces and two convex annular surfaces.

5. The combustion chamber assembly of claim 2, wherein the origin of the post spherical surface is disposed on the center axis of the combustion chamber, the center axis of the combustion chamber being coaxial with a center axis of the piston.

6. The combustion chamber assembly of claim 2, wherein the ratio of a radius of a center portion convex spherical surface, RS1, of the combustion chamber to a maximum bowl diameter, D2, is greater than 0.15 and less than 0.65.

7. The combustion chamber assembly of claim 6, wherein the ratio of the radius of the center portion convex spherical surface, RS1, of the combustion chamber to the maximum bowl diameter, D2, is substantially 0.497.

8. The combustion chamber assembly of claim 2, wherein the ratio of a combustion chamber bowl diameter D2 to a piston diameter D1 is greater than 0.45 and less than 0.85.

9. The combustion chamber assembly of claim 8, wherein the ratio of the combustion chamber bowl diameter D2 to the piston diameter D1 is preferably substantially 0.587.

10. The combustion chamber assembly of claim 2, wherein the ratio of a diameter of the bowl lip D3 to a maximum bowl diameter D2 is greater than 0.45 and less than 0.995.

11. The combustion chamber assembly of claim 10, wherein the ratio of the diameter of the bowl lip D3 to the piston diameter D2 is substantially 0.94.

12. The combustion chamber assembly of claim 2, wherein the ratio of a concave annular surface R2 to a maximum diameter of the bowl D2 is between 0.05 and 0.35.

13. The combustion chamber assembly of claim 12, wherein the ratio of the annular surface R2 to the maximum diameter of the bowl D2 is substantially 0.129.

14. The combustion chamber assembly of claim 2 wherein the ratio of a convex annular surface R3 to a maximum diameter of the bowl D2 is between 0.15 and 0.45.

15. The combustion chamber assembly of claim 14, wherein the ratio of the annular surface R3 to the maximum diameter of the bowl D2 is substantially 0.292.

16. The combustion chamber assembly of claim 2, wherein the ratio of a maximum bowl depth H1 to a maximum bowl diameter D2 is between 0.15 and 0.55.

17. The combustion chamber assembly of claim 16, wherein the ratio of the maximum bowl depth H1 to the maximum bowl diameter D2 is preferably substantially 0.292.

18. The combustion chamber assembly of claim 2, wherein a ratio of a height of the bowl post H2 to a maximum bowl diameter D2 is between 0.05 and 0.35.

19. The combustion chamber assembly of claim 18, wherein the ratio of the bowl post height H2 to the maximum bowl diameter D2 is preferably substantially 0.181.

20. The combustion chamber assembly of claim 2, wherein a ratio of a distance between the bowl reentrancy center and the piston top surface H3 to a maximum bowl diameter D2 is between 0.05 and 0.25.

21. The combustion chamber assembly of claim 20, wherein a ratio of a distance between the bowl reentrancy center and the piston top surface H3 to a maximum bowl diameter D2 is preferably 0.056.

22. The combustion chamber assembly of claim 2, wherein the ratio of the radius of the curved surface R4 to the maximum bowl diameter D2 is between 0.015 and 0.15.

23. The combustion chamber assembly of claim 22, wherein the ratio of the radius of the curved surface R4 to the maximum bowl diameter D2 is preferably substantially 0.028.

24. The combustion chamber assembly of claim 2, wherein the ratio of the radius of the curved surface R5 to the maximum bowl diameter D2 is between 0.05 and 0.25.

25. The combustion chamber assembly of claim 24, wherein the ratio of the radius of the curved surface R5 to the maximum bowl diameter D2 is preferably substantially 0.073.

26. The combustion chamber assembly of claim 1, wherein the juncture between the first curved surface and the post spherical surface is effected by an interposed small annular surface.

27. The combustion chamber assembly of claim 1, wherein the combustion chamber is symmetrical about a combustion chamber center axis.

28. The combustion chamber assembly of claim 1, the combustion chamber having a central axis, the combustion chamber central axis being coincident with a piston central axis.

29. A piston of a diesel engine having a combustion chamber assembly defined therein, comprising:

a combustion chamber being formed free of flat surfaces and being defined intersecting a crown of the piston, the combustion chamber being defined by a first curved surface having a reentrancy formed proximate a first curved surface first end and having a post formed proximate a first curved surface second end, a corner being formed at a juncture of the first curved surface second end and the post, adjacent surfaces having smooth junctures therebetween.

30. The piston of claim 29, a combustion chamber center portion being defined at least in part by the post, a post surface being a convex spherical surface, the spherical surface having a radius and an origin, the spherical surface radius being substantially greater than a radius of the first curved surface; and the combustion chamber first curved surface being a concave annular surface and having an origin of the radius, the first curved surface providing a minor part of the combustion chamber reentrancy.

31. The piston of claim 30, wherein the reentrancy is formed by four sequentially joined annular surfaces in cooperation with the first curved surface.

32. The piston of claim 31, the four sequentially joined annular surfaces and the first curved surface comprising three concave annular surfaces and two convex annular surfaces.

33. The piston of claim 30, wherein the origin of the post spherical surface is disposed on the center axis of the combustion chamber, the center axis of the combustion chamber being coaxial with a center axis of the piston.

34. The piston of claim 29, wherein the juncture between the first curved surface and the post spherical surface is effected by an interposed small annular surface.

35. The piston of claim 29, wherein the combustion chamber is symmetrical about a combustion chamber center axis.

36. The piston of claim 29, the combustion chamber having a central axis, the combustion chamber central axis being coincident with a piston central axis.

37. A method of forming a combustion chamber for use in a diesel engine, comprising:

forming a combustion chamber intersecting a crown of a piston free of flat surfaces, defining the combustion chamber by a first curved surface having a reentrancy formed proximate a first curved surface first end and having a post formed proximate a first curved surface second end, forming a corner at a juncture of the first curved surface second end and the post and forming adjacent surfaces with smooth junctures therebetween.

38. The method of claim 37, including defining a combustion chamber center portion at least in part by the post, forming a post surface as a convex spherical surface, the spherical surface having a radius and an origin, and forming the spherical surface radius substantially greater than a radius of the first curved surface; and forming the combustion chamber first curved surface as a concave annular surface and having an origin and a radius, the first curved surface providing a minor part of the combustion chamber reentrancy.

39. The method of claim 38, including forming the reentrancy by four sequentially joined annular surfaces in cooperation with the first curved surface.

40. The method of claim 39, including comprising the four sequentially joined annular surfaces and the first curved surface of three concave annular surfaces and two convex annular surfaces.

41. The method of claim 39, including disposing the origin of the post on the center axis of the combustion chamber and disposing the center axis of the combustion chamber coaxially with a center axis of the piston.

42. The method of claim 37, including effecting the juncture between the first curved surface and the post by an interposed small annular surface.

43. The method of claim 37, including forming the combustion chamber symmetrically about a combustion chamber center axis.

* * * * *